(12) United States Patent
Morioka et al.

(10) Patent No.: US 10,156,687 B2
(45) Date of Patent: Dec. 18, 2018

(54) OPTICAL RECEPTACLE AND OPTICAL MODULE

(71) Applicant: Enplas Corporation, Saitama (JP)

(72) Inventors: Shimpei Morioka, Saitama (JP); Ayano Kon, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/764,963

(22) PCT Filed: Sep. 16, 2016

(86) PCT No.: PCT/JP2016/077366
§ 371 (c)(1),
(2) Date: Mar. 30, 2018

(87) PCT Pub. No.: WO2017/057035
PCT Pub. Date: Apr. 6, 2017

(65) Prior Publication Data
US 2018/0284368 A1    Oct. 4, 2018

(30) Foreign Application Priority Data

Oct. 2, 2015  (JP) .................................. 2015-197027

(51) Int. Cl.
*G02B 6/42*         (2006.01)
*G02B 27/10*        (2006.01)

(52) U.S. Cl.
CPC ......... *G02B 6/4214* (2013.01); *G02B 6/4286* (2013.01); *G02B 27/10* (2013.01); *G02B 6/4204* (2013.01); *G02B 6/4292* (2013.01)

(58) Field of Classification Search
CPC ...... G02B 6/32; G02B 6/4204; G02B 6/4206; G02B 6/4208; G02B 6/4214; G02B 6/423;

(Continued)

(56) References Cited

U.S. PATENT DOCUMENTS

| 9,244,234 | B2* | 1/2016 | Tanazawa ............ G02B 27/143 |
| 2011/0097037 | A1 | 4/2011 | Kuznia et al. |
| 2015/0030285 | A1 | 1/2015 | Tanazawa |

FOREIGN PATENT DOCUMENTS

| JP | 2009-236939 A | 10/2009 |
| JP | 2012-163903 A | 8/2012 |

(Continued)

OTHER PUBLICATIONS

International Search Report from International Application No. PCT/JP2016/077366 dated Dec. 20, 2016.

*Primary Examiner* — Michael Mooney
(74) *Attorney, Agent, or Firm* — Brundidge & Stanger, P.C.

(57) ABSTRACT

This optical receptacle has a first optical surface, a reflection surface, a second optical surface, a light separation part, and a third optical surface. On the first optical surface, light from a photoelectric conversion element is incident. The reflection surface reflects the light incident on the first optical surface. The second optical surface allows the light reflected by the reflection surface to be emitted toward an end surface of an optical transmission body. The light separation part separates the light reflected by the reflection surface, into monitor light and signal light. The third optical surface allows the monitor light to be emitted toward a detection element. The light separation part includes divided reflection surfaces and divided transmission surfaces. At least one of the divided transmission surfaces includes one or more widened portions each having a width larger than those of the other divided transmission surfaces.

4 Claims, 11 Drawing Sheets

(58) Field of Classification Search
CPC .... G02B 6/425; G02B 6/4246; G02B 6/4286; G02B 6/4292; G02B 6/428; G02B 27/10; G02B 27/1006; G02B 27/108; G02B 27/143
USPC ............ 385/31, 33, 37, 49, 50, 88–93
See application file for complete search history.

(56) References Cited

FOREIGN PATENT DOCUMENTS

| | | |
|---|---|---|
| JP | 2013-061587 A | 4/2013 |
| JP | 2013-137507 A | 7/2013 |
| JP | 2015-022267 A | 2/2015 |

\* cited by examiner

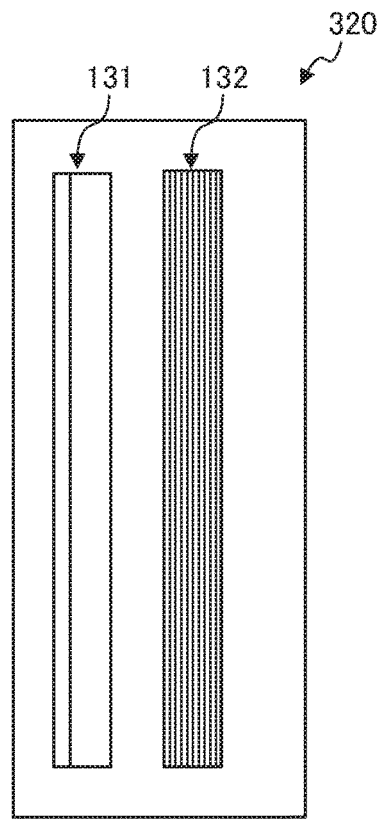 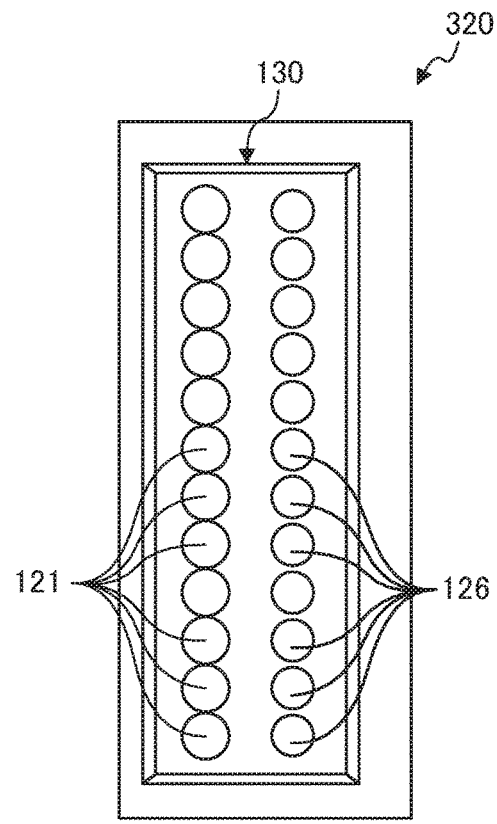
FIG. 9A          FIG. 9B
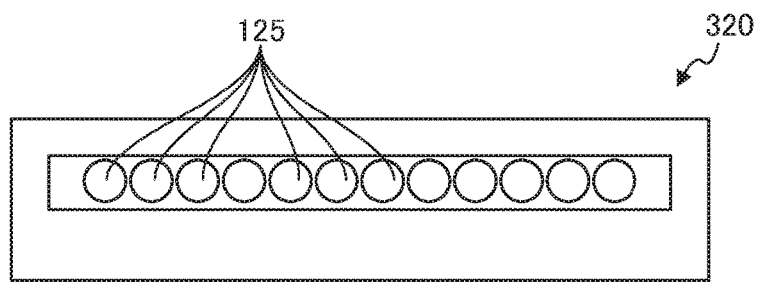
FIG. 9C

US 10,156,687 B2

OPTICAL RECEPTACLE AND OPTICAL MODULE

TECHNICAL FIELD

The present invention relates to an optical receptacle and an optical module including the optical receptacle.

BACKGROUND ART

Conventionally, in optical communications using an optical transmission member such as an optical fiber and an optical waveguide, an optical module including a light emitting element such as a surface-emitting laser (for example, a vertical cavity surface emitting laser (VCSEL)) has been used. Such an optical module includes an optical receptacle that operates such that light containing communication information emitted from a light emitting element is incident on an end surface of the optical transmission member.

In addition, for the purpose of adjusting the optical output or stabilizing the output performance of a light emitting element against temperature variation, some optical modules include a detection element for checking (monitoring) the intensity and the quantity of the emission light emitted from the light emitting element (see, for example, PTL 1).

PTL 1 discloses an optical module including a photoelectric conversion device in which a light-emitting element and a detection element are disposed on a substrate, and an optical receptacle disposed on the substrate of the photoelectric conversion device and configured to optically connect the light-emitting element and an end surface of an optical transmission member.

FIG. 1A is a sectional view schematically illustrating a configuration of optical module 10 disclosed in PTL 1, and FIG. 1B is a partially enlarged sectional view illustrating a configuration of light separation part 33 of optical module 10. FIG. 1B is a partially enlarged sectional view of a region indicated with the broken line in FIG. 1A. In FIG. 1B, the hatching on the cross-section of optical receptacle 30 is omitted to illustrate light paths in optical receptacle 30.

As illustrated in FIG. 1A, optical module 10 disclosed in PTL 1 includes photoelectric conversion device 20 and resin optical receptacle 30. Optical receptacle 30 includes first optical surface 31 that allows incidence of emission light L emitted from light-emitting element 21, reflection surface 32 that reflects light L having entered optical receptacle 30 from first optical surface 31 toward optical transmission member 22 side, light separation part 33 that separates light L reflected by reflection surface 32 into monitor light Lm travelling toward detection element 24 side and signal light Ls travelling toward optical transmission member 22 side, transmission surface 34 that allows signal light Ls emitted out of optical receptacle 30 by light separation part 33 to reenter optical receptacle 30, second optical surface 35 that emits signal light Ls having entered optical receptacle 30 from transmission surface 34 such that the light is condensed at end surface 23 of optical transmission member 22, and third optical surface 36 that emits monitor light Lm toward detection element 24. In addition, light separation part 33 is formed as a part of the internal surface of recess 37 formed in optical receptacle 30.

In optical module 10 disclosed in PTL 1, light L which is emitted from light-emitting element 21 and is incident on first optical surface 31 is reflected by reflection surface 32 toward light separation part 33. Light L reflected by reflection surface 32 is separated by light separation part 33 into signal light Ls and monitor light Lm. Monitor light Lm separated by light separation part 33 is emitted from third optical surface 36 toward the light-receiving surface of detection element 24. Meanwhile, signal light Ls separated by light separation part 33 passes through light separation part 33 and is then emitted out of optical receptacle 30. Then, the light reenters optical receptacle 30 from transmission surface 34. The signal light Ls having reentered optical receptacle 30 from transmission surface 34 is emitted by second optical surface 35 toward end surface 23 of optical transmission member 22.

As illustrated in FIG. 1B, light separation part 33 of optical receptacle 30 disclosed in PTL 1 includes divided reflection surface 33a that totally reflects a part of incident light toward third optical surface 36 as monitor light Lm, and divided transmission surface 33b that allows another part of incident light to pass therethrough toward second optical surface 35 as signal light Ls. Divided reflection surface 33a and divided transmission surface 33b are alternately disposed in the inclination direction of divided reflection surface 33a.

CITATION LIST

Patent Literature

PTL 1
Japanese Patent Application Laid-Open No. 2015-022267

SUMMARY OF INVENTION

Technical Problem

As described above, optical receptacle 30 disclosed in PTL 1 is disposed on photoelectric conversion device 20. From the viewpoint of achieving optical connection between light-emitting element 21 and an end surface of optical transmission member 22 with high coupling efficiency, it is important to dispose optical receptacle 30 at a proper position with respect to photoelectric conversion device 20. For example, optical receptacle 30 is positioned by observing the light-emitting surface of light-emitting element 21 from second optical surface 35 side through second optical surface 35, reflection surface 32 and first optical surface 31, and by adjusting the position of optical receptacle 30 based on the center position of the light-emitting surface of light-emitting element 21 that is visually recognized in second optical surface 35.

In the case where the positioning of optical receptacle 30 is performed in the above-mentioned manner in optical module 10 disclosed in PTL 1, however, a part of the light-emitting surface of light-emitting element 21 might not be visually recognized with divided reflection surface 33a in some cases. In this case, the center position of the light-emitting surface might not be appropriately detected, and consequently the positioning of optical receptacle 30 might not be appropriately performed.

A first object of the present invention is to provide an optical receptacle in which the center position of a light-emitting surface of a light-emitting element can be appropriately detected from the side of the optical surface for an optical transmission member even with a light separation part including a divided reflection surface. In addition, a second object of the present invention is to provide an optical module including the optical receptacle.

Solution to Problem

An optical receptacle according to embodiments of the present invention is configured to be disposed between an optical transmission member and a photoelectric conversion device, the photoelectric conversion device including a substrate, and a photoelectric conversion element and a detection element for monitoring emission light which has been emitted from the photoelectric conversion element that are disposed on the substrate, the optical receptacle being configured for optically coupling the photoelectric conversion element and an end surface of the optical transmission member, the optical receptacle including: a first optical surface that allows incidence of the emission light which has been emitted from the photoelectric conversion element, or that emits, toward the photoelectric conversion element, reception light which has been emitted from the end surface of the optical transmission member and has passed through inside of the optical receptacle; a reflection surface that reflects, in a direction along the substrate, the emission light which has entered the optical receptacle from the first optical surface, or that reflects, in a direction perpendicular to the substrate, the reception light which has passed through the inside of the optical receptacle; a second optical surface that emits, toward the end surface of the optical transmission member, the emission light which has been reflected by the reflection surface, or that allows incidence of the reception light which has been emitted from the end surface of the optical transmission member; a light separation part that separates the emission light which has been reflected by the reflection surface into monitor light travelling toward the detection element and signal light travelling toward the end surface of the optical transmission member, or that allows, to travel toward the first optical surface side, at least a part of the reception light which has entered the optical receptacle from the second optical surface, the light separation part being disposed on a light path between the first optical surface and the second optical surface; and a third optical surface that emits, toward the detection element, the monitor light which has been separated by the light separation part. The light separation part includes: a plurality of divided reflection surfaces that are tilted to an optical axis of the emission light which has been reflected by the reflection surface, and a plurality of divided transmission surfaces that are perpendicular to the optical axis of the emission light which has been reflected by the reflection surface and an optical axis of the reception light which has entered the optical receptacle from the second optical surface. The plurality of divided reflection surfaces and the plurality of divided transmission surfaces are alternately disposed along a first direction, the first direction being an inclination direction of the divided reflection surface. The plurality of divided reflection surfaces internally reflect, toward the third optical surface side, a part of the emission light which has been reflected by the reflection surface as the monitor light. The plurality of divided transmission surfaces allow, to pass through the plurality of divided transmission surfaces toward the second optical surface side, a part of the emission light which has been reflected by the reflection surface as the signal light, or allow, to pass through the plurality of divided transmission surfaces toward the reflection surface side, a part of the reception light which has entered the optical receptacle from the second optical surface. At least one of the plurality of divided transmission surfaces includes a wide part whose width is greater than a width of another of the plurality of divided transmission surfaces in the direction perpendicular to the substrate.

An optical module according to embodiments of the present invention includes: a photoelectric conversion device including a substrate, a photoelectric conversion element disposed on the substrate and having a light emission region or a light reception region, and a detection element disposed on the substrate and configured for monitoring emission light which has been emitted from the light emission region of the photoelectric conversion element; and the above-mentioned optical receptacle. In the direction perpendicular to the substrate and in the second direction orthogonal to both the direction perpendicular to the substrate and the first direction, a length of the wide part is equal to or greater than a length of an image of the light emission region or the light reception region of the photoelectric conversion element in the plurality of divided transmission surfaces.

Advantageous Effects of Invention

With the present invention, an optical receptacle that can be easily and properly positioned with respect to the photoelectric conversion device can be provided. In addition, with the present invention, an optical module that can be manufactured at low cost and in a short time can be provided.

BRIEF DESCRIPTION OF DRAWINGS

FIGS. 9A to 9C illustrate a configuration of an optical receptacle according to Embodiment 3;

DESCRIPTION OF EMBODIMENTS

Embodiments of the present invention are described in detail below with reference to the accompanying drawings.

Embodiment 1

(Configuration of Optical Module)

Figure 1A:
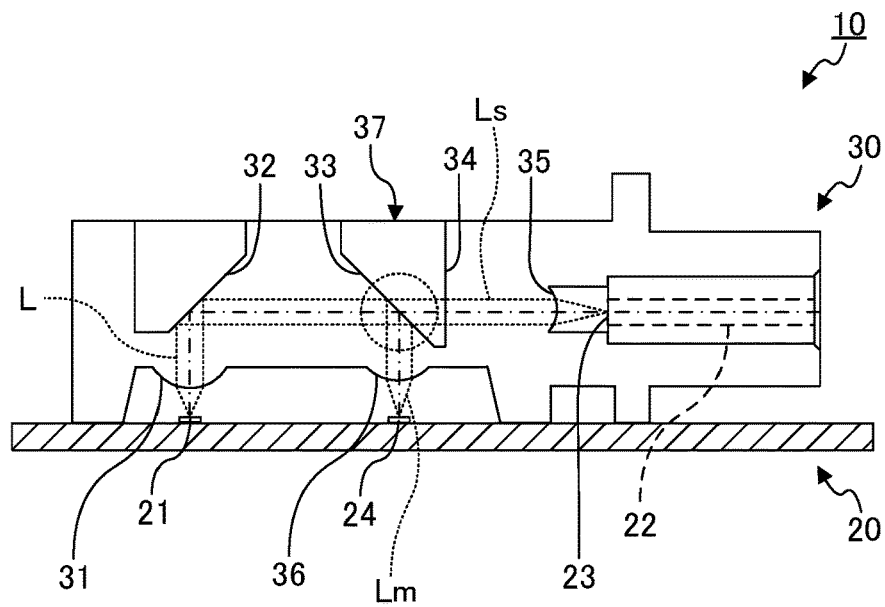
FIGS. 1A and 1B illustrate a configuration of an optical module disclosed in PTL 1.
Figure 1B:
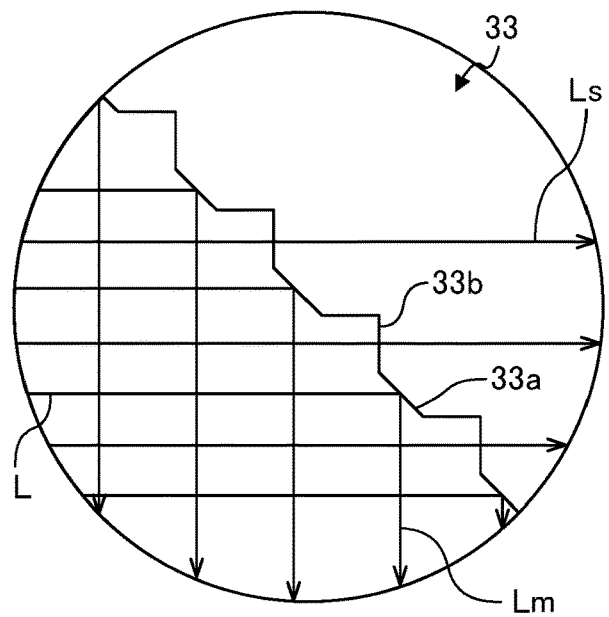
Figure 2:
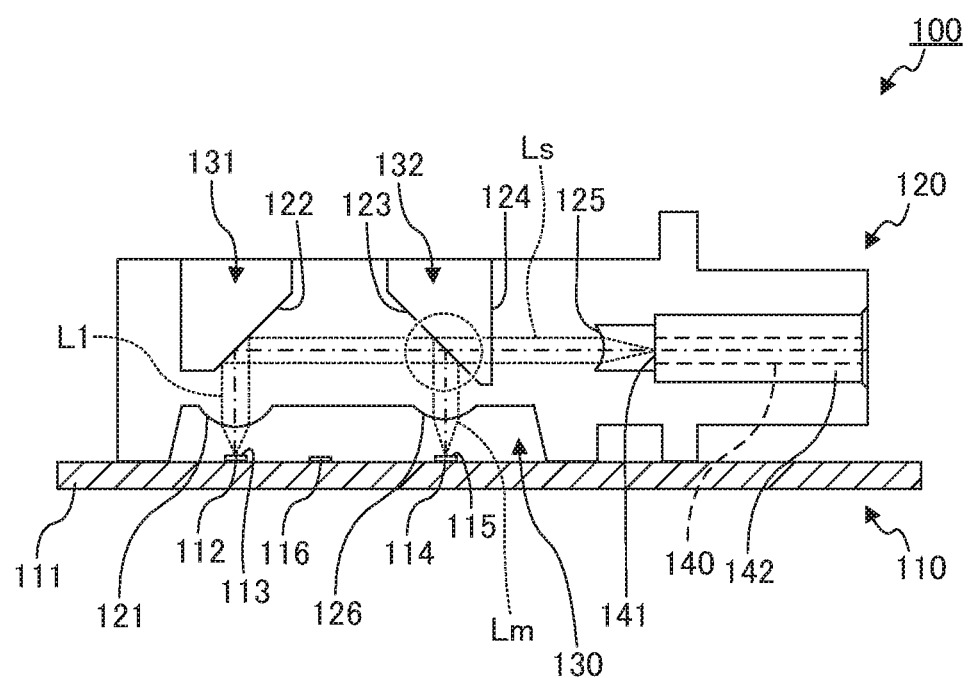
FIG. 2 is a sectional view schematically illustrating a configuration of an optical module according to Embodiment 1.

FIG. 2 is a sectional view schematically illustrating a configuration of optical module 100 according to Embodiment 1 of the present invention. It is to be noted that, in FIG. 2, the hatching on the cross-section of optical receptacle 120 is omitted to illustrate light paths in optical receptacle 120.

In addition, in FIG. 2, the dashed line indicates an optical axis of light, and the broken line indicates an outer diameter of light.

As illustrated in FIG. 2, optical module 100 includes photoelectric conversion device 110 of a substrate mounting type including a photoelectric conversion element (in the present embodiment, light-emitting element 112), optical receptacle 120, and optical transmission member 140. Optical module 100 is an optical module for transmission, and is used in the state where optical transmission member 140 is connected with optical receptacle 120 through ferrule 142. Photoelectric conversion device 110 and optical receptacle 120 are fixed to each other with a publicly known fixing member such as an adhesive agent (for example, heat/ultraviolet curing resin). In the state where optical receptacle 120 is disposed between photoelectric conversion device 110 and optical transmission member 140, optical receptacle 120 optically couples photoelectric conversion device 110 and end surface 141 of optical transmission member 140. It is to be noted that, in the following description, the surface of optical receptacle 120 on which optical transmission member 140 is connected is "front surface."

The type of optical transmission member 140 is not limited, and optical transmission member 140 may be an optical fiber, a light waveguide or the like. In the present embodiment, optical transmission member 140 is an optical fiber. The optical fiber may be of a single mode type, or a multiple mode type. The number of optical transmission members 140 is not limited. In the present embodiment, one optical transmission member 140 is provided.

In the state where optical receptacle 120 is disposed between photoelectric conversion device 110 and optical transmission member 140, optical receptacle 120 optically couples the photoelectric conversion element and an end surface 141 of optical transmission member 140. At this time, in optical receptacle 120, a part of emission light L1 emitted from the photoelectric conversion element (light-emitting element 112) of photoelectric conversion device 110 is separated as signal light Ls, and another part of emission light L1 is separated as monitor light Lm for monitoring the output (for example, intensity, light quantity, and the like) of emission light L1. Details of optical receptacle 120 are described later.

Photoelectric conversion device 110 includes substrate 111, one photoelectric conversion element (in the present embodiment, light-emitting element 112), one detection element 114, and control part 116.

In the present embodiment, optical module 100 is an optical module for transmission, and therefore light-emitting element 112 is used as the photoelectric conversion element. In the case where optical module 100 is an optical module for reception, a light-receiving element is used as the photoelectric conversion element. Further, in the case of an optical module for transmission and reception that includes a plurality of photoelectric conversion elements (see Embodiment 3), a light-emitting element and a light-receiving element are used as the photoelectric conversion elements.

Substrate 111 holds light-emitting element 112, detection element 114, control part 116 and optical receptacle 120. Substrate 111 is, for example, a glass composite substrate, a glass epoxy substrate, a flexible substrate or the like.

Light-emitting element 112 is disposed on substrate 111, and emits laser light in a direction perpendicular to the surface of substrate 111. To be more specific, light-emitting element 112 emits laser light from light-emitting surface 113 (light emission region). The shape of light-emitting surface 113 is not limited. In the present embodiment, light-emitting surface 113 has a circular shape. The number of light-emitting element 112 is not limited. As described above, in the present embodiment, one light-emitting element 112 is provided. Also, the position of light-emitting element 112 is not limited. Light-emitting element 112 is, for example, a vertical cavity surface emitting laser (VCSEL).

Detection element 114 is disposed on substrate 111, and receives monitor light Lm emitted from optical receptacle 120. Detection element 114 is a photodiode (PD), for example. In the present embodiment, detection element 114 is disposed on substrate 111 on optical transmission member 140 side relative to light-emitting element 112. The number of detection element 114 is not limited. As described above, in the present embodiment, one detection element 114 is provided. In addition, from the viewpoint of preventing reflection light from detection element 114 from returning to optical receptacle 120, the optical axis of monitor light Lm that is incident on detection element 114 may be tilted with respect to detection surface 115 of detection element 114.

Control part 116 is disposed on substrate 111, and electrically connected with light-emitting element 112 and detection element 114 through a wiring not illustrated in the drawings. On the basis of the intensity and/or the light quantity of monitor light Lm received by detection element 114, control part 116 controls the output of emission light L1 that is emitted by light-emitting element 112.

(Configuration of Optical Receptacle)

Optical receptacle 120 is disposed on substrate 111 of photoelectric conversion device 110. The configuration of optical receptacle 120 is now described in detail.

Figure 3A:
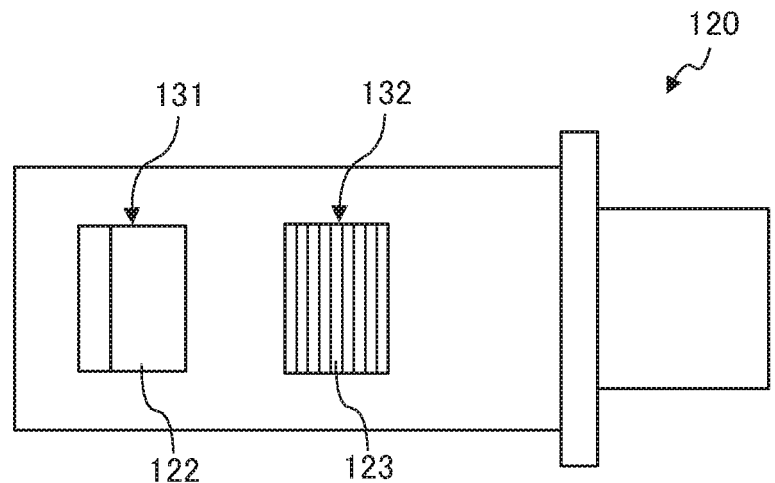
FIGS. 3A and 3B illustrate a configuration of an optical receptacle according to Embodiment 1.
Figure 3B:
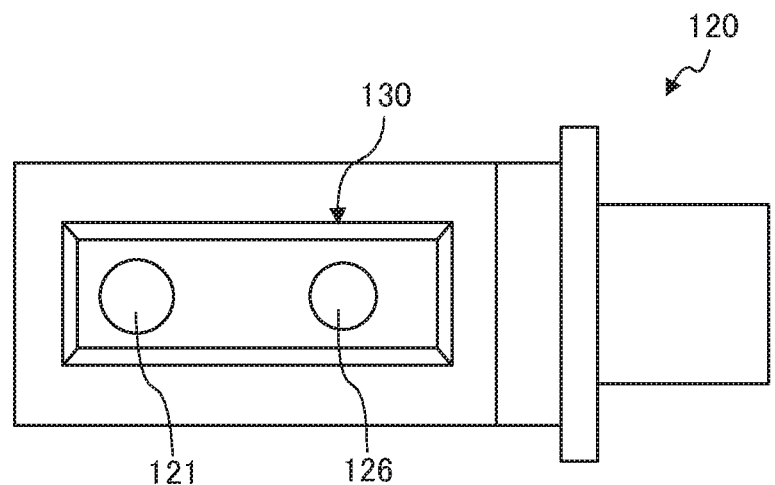

FIGS. 3A and 3B illustrate a configuration of optical receptacle 120 according to Embodiment 1. FIG. 3A is a plan view of optical receptacle 120, and FIG. 3B is a bottom view of optical receptacle 120.

As illustrated in FIGS. 2 to 3B, optical receptacle 120 is a member having a substantially cuboid shape. In the present embodiment, first recess 130 having a truncated square pyramid shape is formed on the bottom surface of optical receptacle 120. Second recess 131 having a pentagonal prism shape and third recess 132 having a substantially pentagonal prism shape are formed side by side on the top surface of optical receptacle 120 in the longitudinal direction of optical receptacle 120. Optical receptacle 120 is optically transparent, and emits, toward end surface 141 of optical transmission member 140, signal light Ls that is a part of emission light L1 emitted from light-emitting surface 113 of light-emitting element 112.

Optical receptacle 120 according to the present embodiment includes first optical surface 121, reflection surface 122, light separation part 123, transmission surface 124, second optical surface 125, and third optical surface 126. In the present embodiment, one first optical surface 121, one second optical surface 125 and one third optical surface 126 are provided.

Optical receptacle 120 is formed of a material that is transparent to light of a wavelength used in optical communications. Examples of such a material include transparent resins such as polyetherimide (PEI) and cyclic olefin resin.

First optical surface 121 is an optical surface that allows emission light L1 emitted from light-emitting element 112 to enter optical receptacle 120 while refracting emission light L1. Here, first optical surface 121 converts emission light L1 emitted from light-emitting element 112 into collimate light. First optical surface 121 is formed on the bottom surface of first recess 130 to face light-emitting surface 113 of light-emitting element 112. In the present embodiment, first optical surface 121 has a shape of a convex lens surface protruding toward light-emitting element 112. In addition, in plan view, first optical surface 121 has a circular shape. Preferably, the central axis of first optical surface 121 is perpendicular to light-emitting surface 113 of light-emitting element 112. In addition, preferably, the central axis of first optical surface 121 coincides with the optical axis of emission light L1 emitted from light-emitting element 112.

Reflection surface 122 is an optical surface that reflects, in the direction along substrate 111, light L1 which has entered optical receptacle 120 from first optical surface 121. With this configuration, reflection surface 122 reflects, toward second optical surface 125 side, light L1 which has entered optical receptacle 120 from first optical surface 121. Reflection surface 122 forms a part of the internal surface of second recess 131. Reflection surface 122 is tilted such that the distance of reflection surface 122 to optical transmission member 140 (front surface side) decreases from the bottom surface toward the top surface of optical receptacle 120. The inclination angle of reflection surface 122 is not limited. In the present embodiment, the inclination angle of reflection surface 122 is 45 degrees with respect to the optical axis of light incident on reflection surface 122. The shape of reflection surface 122 is not limited, and may be a plane or a curved surface. In the present embodiment, reflection surface 122 has a plane shape. Light L1 which has entered optical receptacle 120 from first optical surface 121 is incident on reflection surface 122 at an incident angle greater than the critical angle.

Light separation part 123 separates, into monitor light Lm and signal light Ls, light L1 which has entered optical receptacle 120 from first optical surface 121 and has been reflected by reflection surface 122. Here, monitor light Lm is light travelling toward detection element 114 side, and signal light Ls is light travelling toward end surface 141 side of optical transmission member 140. Light separation part 123 is disposed on a light path between first optical surface 121 and second optical surface 125. Light separation part 123 forms a part of the internal surface of third recess 132. A main feature of optical module 100 according to the present embodiment is light separation part 123 of optical receptacle 120. Therefore, details of light separation part 123 are described later.

Transmission surface 124 allows, to reenter optical receptacle 120, signal light Ls which has been separated by light separation part 123 and has been emitted out of optical receptacle 120. Transmission surface 124 is disposed on the top surface side of optical receptacle 120. Preferably, in the present embodiment, transmission surface 124 is a surface perpendicular to signal light Ls separated by light separation part 123. With such a configuration, it is possible to allow signal light Ls travelling toward end surface 141 of optical transmission member 140 to enter optical receptacle 120 without refracting signal light Ls.

It is to be noted that transmission surface 124 may be a surface tilted with respect to the optical axis of signal light Ls separated by light separation part 123. In this case, transmission surface 124 is tilted such that the distance of transmission surface 124 to second optical surface 125 decreases from the bottom surface toward the top surface of optical receptacle 120. The inclination angle of transmission surface 125 that is a tilted surface is not limited, but preferably is an inclination angle corresponding to a releasing taper for releasing in injection molding.

Second optical surface 125 is an optical surface that emits, toward end surface 141 of optical transmission member 140, signal light Ls which has been separated by light separation part 123 and has entered optical receptacle 120 from transmission surface 124. Here, second optical surface 125 emits signal light Ls toward end surface 141 of optical transmission member 140 while converging signal light Ls. In the present embodiment, second optical surface 125 has a shape of a convex lens surface protruding toward end surface 141 of optical transmission member 140. In plan view, second optical surface 125 has a circular shape. Preferably, the central axis of second optical surface 125 is perpendicular to end surface 141 of optical transmission member 140.

Third optical surface 126 is an optical surface that emits, toward detection element 114, monitor light Lm separated by light separation part 123. Here, third optical surface 126 emits monitor light Lm toward detection element 114 while converging monitor light Lm. In the present embodiment, third optical surface 126 is a convex lens surface protruding toward detection element 114. As described above, from the viewpoint of preventing reflection light from detection element 114 from returning into optical receptacle 120, it is preferable that the central axis of third optical surface 126 be tilted with respect to detection surface 115 of detection element 114.

Figure 4A:
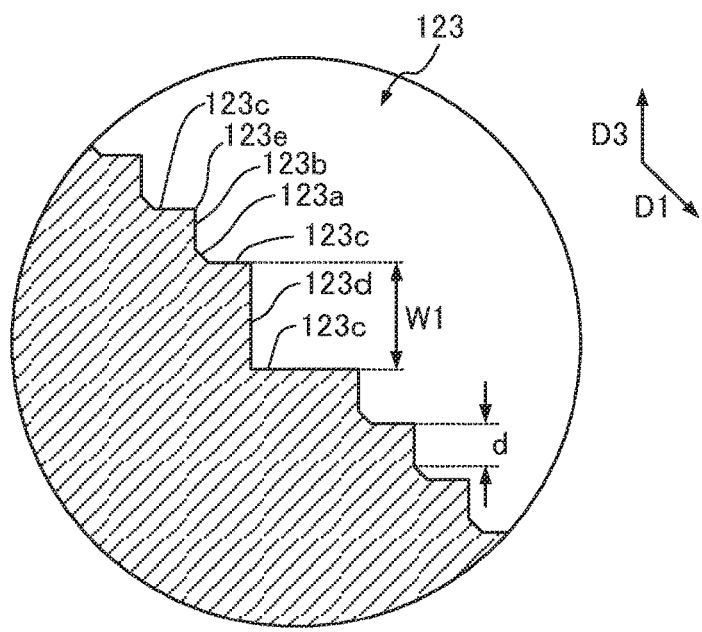
FIGS. 4A and 4B illustrate a configuration of a light separation part of the optical receptacle according to Embodiment 1.
Figure 4B:
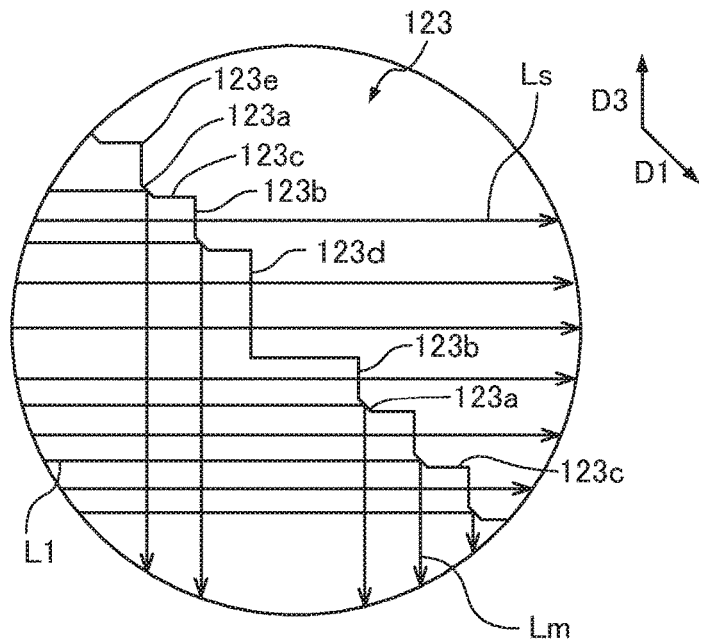
Figure 5:
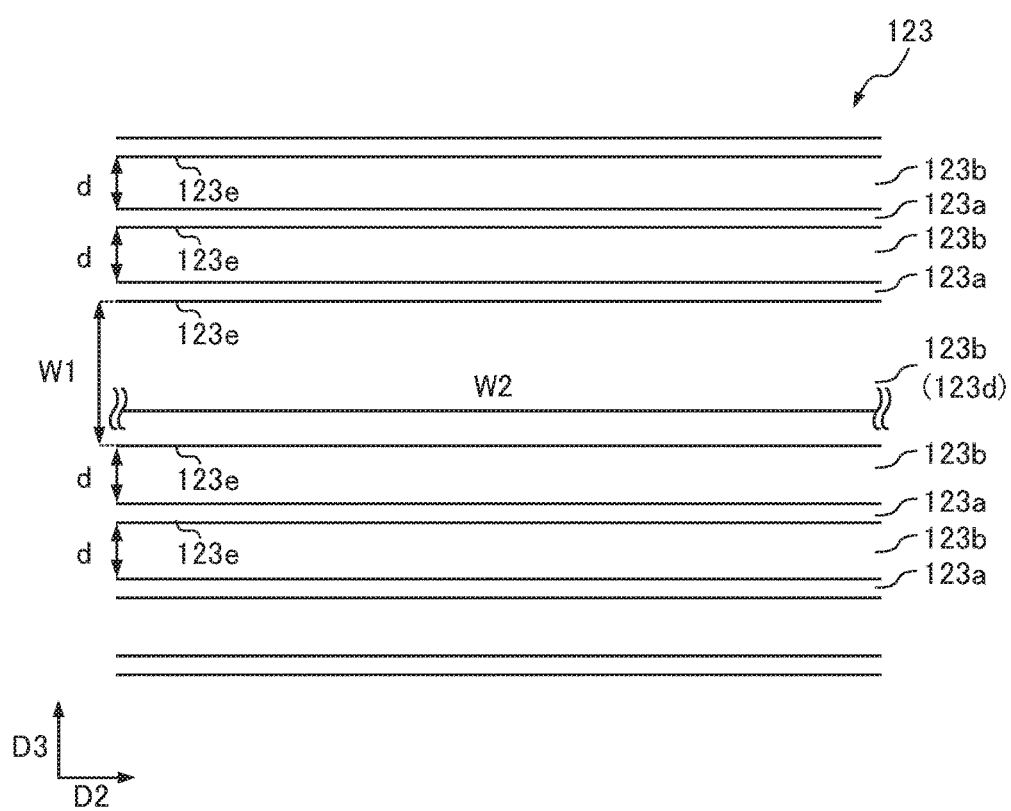
FIG. 5 illustrates a configuration of the light separation part of the optical receptacle according to Embodiment 1.

Now a configuration of light separation part 123 is described. FIG. 4A to FIG. 5 illustrate a configuration of light separation part 123 of optical receptacle 120 according to Embodiment 1. FIG. 4A is a partially enlarged sectional view of the region indicated with the broken line in FIG. 2, and FIG. 4B is a partially enlarged sectional view of light paths in a region around light separation part 123 of optical receptacle 120. In FIG. 4B, the hatching on the cross-section of optical receptacle 120 is omitted to illustrate light paths in optical receptacle 120. FIG. 5 is a partially enlarged front view of the region indicated with the broken line in FIG. 2, and is a partially enlarged view of a part of light separation part 123 as viewed from transmission surface 124 side.

As illustrated in FIGS. 4A to 5, light separation part 123 includes a plurality of divided reflection surfaces 123a, a plurality of divided transmission surfaces 123b, a plurality of divided step surfaces 123c and a plurality of ridgelines 123e. Divided reflection surfaces 123a and divided transmission surfaces 123b are alternately disposed along first direction D1. Here, the "first direction" is the inclination direction of divided reflection surface 123a (see arrow D1 in FIGS. 4A and 4B). In addition, in the following description, the "second direction" is a direction orthogonal to both a direction perpendicular to substrate 111 and first direction D1 (the depth direction in FIGS. 4A and 4B; see arrow D2 of FIG. 5). In addition, the "third direction" is a direction perpendicular to substrate 111 (see arrow D3 in FIGS. 4A to 5).

Divided reflection surfaces 123a are surfaces tilted with respect to the optical axis of light L1 reflected by reflection surface 122. In the present embodiment, divided reflection surfaces 123a are tilted such that the distance of each divided reflection surface 123a to second optical surface 125 (optical transmission member 140) decreases from the top surface toward the bottom surface of optical receptacle 120. As illustrated in FIG. 4B, divided reflection surfaces 123a internally reflect, toward third optical surface 126 side, a part of light L1 reflected by reflection surface 122 as monitor light Lm. The inclination angle of each divided reflection surface 123a is 45 degrees with respect to the optical axis of light L1 reflected by reflection surface 122. Divided reflection surfaces 123a are divided in first direction D1 and disposed at a predetermined interval. Divided reflection surfaces 123a are disposed on the same plane in first direction D1.

Divided transmission surfaces 123b are surfaces perpendicular to the optical axis of light L1 reflected by reflection surface 122. Widths d of divided transmission surfaces 123b may be equal to each other except in wide part 123d described later, or may be different from each other. In the present embodiment, as illustrated in FIG. 5, widths d of divided transmission surfaces 123b in a direction perpendicular to substrate 111 (third direction D3) are equal to each other except in wide part 123d. In addition, divided transmission surfaces 123b are disposed in parallel to each other.

In addition, at least one of divided transmission surfaces 123b includes one or more wide parts 123d each of which has a width larger than that of other divided transmission surfaces 123b in a direction perpendicular to substrate 111 (third direction D3). In the following description, W1 represents the length of wide part 123d in third direction D3, and W2 represents the length of wide part 123d in second direction D2. In the present embodiment, as illustrated in FIG. 5, wide part 123d extends over the entirety of divided transmission surface 123b including wide part 123d in second direction D2 orthogonal to both a direction perpendicular to substrate 111 (third direction D3) and first direction D1. That is, the entirety of one of divided transmission surfaces 123b is wide part 123d. As described in detail later, in a direction perpendicular to substrate 111 (third direction D3) and in second direction D2, each of length W1 and length W2 of wide part 123d is equal to or greater than the image length (φD in the present embodiment) of light-emitting surface 113 of light-emitting element 112 in divided transmission surface 123b (W1, W2≥D). In the present embodiment, in third direction D3 and second direction D2, each of length W1 and length W2 of wide part 123d is greater than image length D of light-emitting surface 113 of light-emitting element 112 in divided transmission surface 123b (W1, W2≥D). Divided transmission surfaces 123b (including wide part 123d) allow, to pass therethrough toward second optical surface 125 as signal light Ls, a part of light L1 reflected by reflection surface 122. At this time, divided transmission surfaces 123b emit signal light Ls out of optical receptacle 120. Also, divided transmission surfaces 123b are divided in first direction D1 at a predetermined interval. A main feature of optical receptacle 120 according to the present embodiment is wide part 123d of light separation parts 123. Details of the functions of wide part 123d are described later.

Divided step surfaces 123c are surfaces that are parallel to the optical axis of light L1 reflected by reflection surface 122, and connect divided reflection surfaces 123a and divided transmission surfaces 123b. Also, divided step surfaces 123c are disposed at a predetermined interval in first direction D1. Divided step surfaces 123c are disposed in parallel to each other.

As illustrated in FIG. 4A, divided reflection surface 123a, divided step surface 123c and divided transmission surface 123b (including wide part 123d) are arranged in this order along first direction D1 (a direction from the top surface to the bottom surface). Each ridgeline 123e is formed between divided step surface 123c and divided transmission surface 123b. In the present embodiment, two ridgelines 123e adjacent to each other are parallel to each other. The smaller angle of the angles between divided reflection surface 123a and divided transmission surface 123b is 135 degrees. Also, the smaller angle of the angles between divided reflection surface 123a and divided step surface 123c is 135 degrees.

Light separation at light separation part 123 is now described.

As illustrated in FIG. 4B, a part of light L1 reflected by reflection surface 122 is internally incident on divided reflection surface 123a at an incident angle greater than the critical angle. Divided reflection surface 123a internally reflects, toward third optical surface 126 side, a part of light L1 reflected by reflection surface 122, thereby generating monitor light Lm. In addition, a remaining part of light L1 reflected by reflection surface 122 is incident on divided transmission surface 123b. Divided transmission surface 123b allows a remaining part of light L1 reflected by reflection surface 122 to pass therethrough, thereby generating signal light Ls travelling toward end surface 141 of optical transmission member 140. Signal light Ls is emitted to third recess 132. At this time, divided transmission surface 123b emits signal light Ls without refracting signal light Ls since divided transmission surface 123b is a surface perpendicular to signal light Ls. It is to be noted that signal light Ls is not incident on divided step surface 123c since divided step surface 123c is formed in parallel to the incident direction of signal light Ls.

The light quantity ratio between signal light Ls and monitor light Lm is not limited as long as monitor light Lm capable of monitoring the intensity and the quantity of light L1 emitted from light emitting element 112, and signal light Ls of a desired quantity can be obtained. The light quantity ratio between signal light Ls and monitor light Lm is approximately equal to the area ratio between divided transmission surface 123b and divided reflection surface 123a in light separation part 123 viewed from reflection surface 122 side. In view of this, the light quantity ratio between signal light Ls and monitor light Lm can be adjusted by changing the area ratio between divided transmission surface 123b and divided reflection surface 123a in light separation part 123 viewed from reflection surface 122 side. Preferably, the light quantity ratio of signal light Ls to monitor light Lm is 5:5 to 9:1, more preferably, 7:3. In the present embodiment, the ratio of signal light Ls to monitor light Lm is 8:2.

The manufacturing method of optical receptacle 120 is not limited. Optical receptacle 120 is manufactured by injection molding, for example. Here, it is preferable that wide part 123d extend over the entirety of divided transmission surface 123b including wide part 123d in second direction D2 orthogonal to both a direction perpendicular to substrate 111 (third direction D3) and first direction D1 from a view point of ease of manufacturing by injection molding.

(Light Paths in Optical Module)

Light paths in optical module 100 are now described.

As illustrated in FIG. 2, emission light L1 emitted from light-emitting element 112 enters optical receptacle 120 from first optical surface 121. At this time, the incident light L1 is converted to collimate light by first optical surface 121, and advances toward reflection surface 122. Next, light L1 having reached reflection surface 122 is reflected by reflection surface 122 toward light separation part 123. A part of light L1 having reached light separation part 123 is internally reflected by divided reflection surface 123a toward third optical surface 126, and becomes monitor light Lm. Monitor light Lm is emitted out of optical receptacle 120 by third optical surface 126, and reaches detection surface 115 of detection element 114. In this manner, a part of emission light L1 from light-emitting element 112 reaches detection element 114 as monitor light Lm.

Meanwhile, another part of light L1 which has entered optical receptacle 120 from first optical surface 121 and has been reflected by reflection surface 122 to reach light separation part 123 passes through divided transmission surface 123b toward transmission surface 124, and is then emitted out of optical receptacle 120 to become signal light Ls. Next, signal light Ls reenters optical receptacle 120 from transmission surface 124, and reaches second optical surface 125. Signal light Ls that has reached second optical surface 125 is emitted out of optical receptacle 120 by second optical surface 125, and reaches end surface 141 of optical transmission member 140. In this manner, another part of emission light L1 emitted from light-emitting element 112 reaches end surface 141 of optical transmission member 140 as signal light Ls.

(Function of Wide Part)

A function of wide part 123d of optical receptacle 120 according to the present embodiment is now described in detail with reference to the accompanying drawings. For comparison, an optical receptacle including light separation part 123' provided with no wide part 123d (hereinafter referred to also as "optical receptacle according to comparative example") is also described.

Figure 6A:
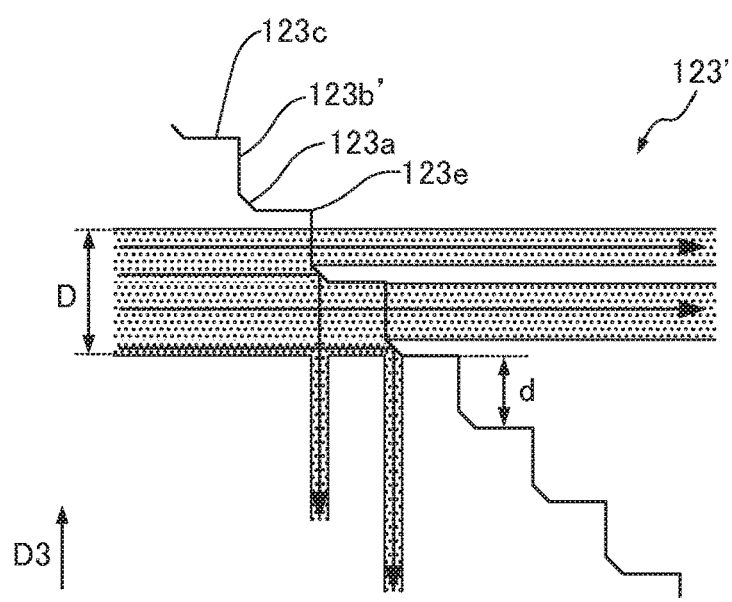
FIGS. 6A and 6B are used for describing a function of a wide part.
Figure 6B:
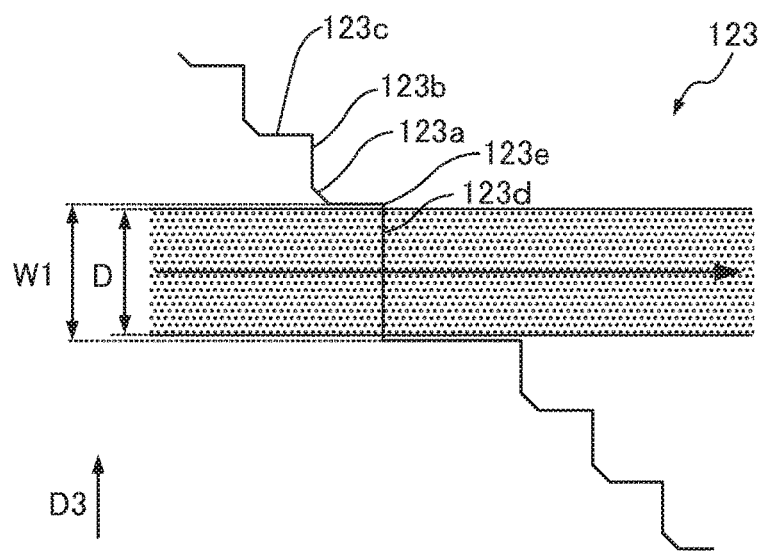

FIGS. 6A and 6B are used for describing a function of wide part 123d. FIG. 6A is a partially enlarged sectional view of light separation part 123' of the optical receptacle according to comparative example, and FIG. 6B is a partially enlarged sectional view of light separation part 123 of optical receptacle 120 according to the present embodiment. In FIGS. 6A and 6B, to illustrate paths of an image of light-emitting surface 113 of light-emitting element 112 that passes through the inside of optical receptacle 120, the hatching on the cross-section of optical receptacle 120 is omitted.

As described above, from the viewpoint of optically connecting light-emitting element 112 and end surface 141 of optical transmission member 140 with high coupling efficiency, it is important to dispose optical receptacle 120 at a proper position with respect to photoelectric conversion device 110. The positioning of optical receptacle 120 is performed by adjusting the position of optical receptacle 120 while detecting the center position of light-emitting surface 113 by visually recognizing light-emitting surface 113 of light-emitting element 112 from second optical surface 125 side. For example, light-emitting surface 113 of light-emitting element 112 can be detected by installing a CCD camera at a position opposite to second optical surface 125 and by recognizing an image of light-emitting surface 113 in second optical surface 125. Then, the position of optical receptacle 120 is adjusted based on the detected center position of light-emitting surface 113. At this time, the center position of light-emitting surface 113 is detected based on an image of light-emitting surface 113 detected through first optical surface 121, reflection surface 122, divided transmission surface 123b, transmission surface 124 and second optical surface 125 since light-emitting element 112 cannot be directly visually recognized from second optical surface 125 side.

Positioning of the optical receptacle according to the comparative example and positioning of optical receptacle 120 according to the present embodiment are described below. It is to be noted that the dotted regions of FIGS. 6A and 6B indicate paths of an image of light-emitting surface 113 of light-emitting element 112. In the present embodiment, light having reached first optical surface 121 enters the optical receptacle while being collimated by first optical surface 121, and therefore, the size of an image of light-emitting surface 113 of light-emitting element 112 in a cross-section perpendicular to the light travelling direction is constant. In addition, in third direction D3, length φD of the image of light-emitting surface 113 is greater than length d of divided transmission surfaces 123b and 123b' and smaller than length W1 of wide part 123d (W1>D>d). In addition, while the lengths are compared only in third direction D3 for simplicity's sake here, the same applies to second direction D2. In optical receptacle 120 according to the present embodiment, length φD of the image of light-emitting surface 113 is smaller than length W2 of wide part 123d (W2≥D) also in second direction D2.

First, the optical receptacle according to the comparative example is described. As illustrated in FIG. 6A, in the optical receptacle including light separation part 123' provided with no wide part 123d, length d of divided transmission surface 123b' is smaller than the image length D of light-emitting surface 113 (D>d) in third direction D3. Consequently, a part of the image of light-emitting surface 113 cannot be visually recognized from second optical surface 125 side at all times with divided reflection surface 123a. That is, even when the optical receptacle is moved in all directions, the entire image of light-emitting surface 113 does not appear in second optical surface 125. Consequently, when light-emitting surface 113 is visually recognized from second optical surface 125 side, the center position of light-emitting surface 113 might not be detected in some situation. As a result, it is difficult to properly perform positioning of the optical receptacle with respect to photoelectric conversion device 110.

Conventionally, in the case where the center position of light-emitting surface 113 cannot be properly detected by visually recognizing light-emitting surface 113 from second optical surface 125 side as described above, light-emitting element 112 is actually controlled to emit light in the state where optical transmission member 140 is connected with the optical receptacle, and the emission light is received by second optical surface 125, whereby the coupling efficiency between light-emitting element 112 and end surface 141 of optical transmission member 140 is measured. Then, the positioning of the optical receptacle is performed such that the coupling efficiency is maximized. The conventional method, however, requires additional external devices such as an external circuit for controlling light-emitting element 112 to emit light, a detection device for detecting emission light, and a measuring device for measuring the coupling efficiency between light-emitting element 112 and end surface 141 of optical transmission member 140. Further, the number and the time for processes for the positioning of the optical receptacle increases since it is necessary to connect optical transmission member 140 to the optical receptacle, and to detect the emission light. As a result, the manufacturing cost and the manufacturing time for the optical module including the optical receptacle according to comparative example disadvantageously increase.

In contrast, in the optical module according to the present embodiment, wide part 123d is formed at a portion where an image of light-emitting surface 113 should pass in divided transmission surface 123b as illustrated in FIG. 6B. In a direction perpendicular to substrate 111 (third direction D3) and in second direction D2 (the depth direction in FIG. 6B), each of length W1 and length W2 of wide part 123d of divided transmission surface 123b is greater than the image length (φD) of light-emitting surface 113 of light-emitting element 112 (W1, W2≥D). With this configuration, in optical receptacle 120 according to the present embodiment, when the position of optical receptacle 120 is generally proper, the entire image of light-emitting surface 113 reaches second optical surface 125 without being blocked by divided reflection surface 123a. Accordingly, with optical receptacle 120 according to the present embodiment, the center position of light-emitting surface 113 can be properly detected when light-emitting surface 113 of light-emitting element 112 is visually recognized from second optical surface 125 side. As a result, optical receptacle 120 can be properly positioned with respect to photoelectric conversion device 110. In addition, in comparison with conventional methods, the above-mentioned additional external devices are not required and the positioning can be performed with a simple method, and therefore, optical module 100 according to the present embodiment can be manufactured at a low cost and in a short time.

As described above, in third direction D3 and second direction D2, each of length W1 and length W2 of wide part 123d is equal to or greater than image length (φD) of light-emitting surface 113 of light-emitting element 112 in divided transmission surface 123b (W1, W2≥D and W1, W2≥D in the present embodiment). However, from the viewpoint of allowing an image of light-emitting surface 113 to reach second optical surface 125 without being blocked by divided reflection surface 123a even when the path of an image of light-emitting surface 113 of light-emitting element 112 that passes through divided transmission surface 123b is shifted due to dimension errors of first optical surface 121 and the like, it is preferable that, in third direction D3 and second direction D2, each of length W1 and length W2 of wide part 123d be equal to or greater than the sum of image length (φD) of light-emitting surface 113 of light-emitting element 112 in divided transmission surface 123b and positional displacement L obtained by taking dimension errors and the like into consideration (W1, W2≥D+L).

(Effect)

As described above, light separation part 123 of optical receptacle 120 according to Embodiment 1 includes light separation part 123 including wide part 123d as a part of a plurality of divided transmission surfaces 123b. With this configuration, by observing an image of light-emitting surface 113 (light emission region) of light-emitting element 112 from second optical surface 125 side, the center position of light-emitting surface 113 of light-emitting element 112 can be properly detected. Accordingly, optical receptacle 120 according to the present embodiment photoelectric can be easily positioned with respect to conversion device 110 in a short time. That is, optical module 100 according to the present embodiment can be manufactured at a low cost and in a short time.

Embodiment 2

An optical module according to Embodiment 2 is different from optical module 100 according to Embodiment 1 only in configuration of the optical receptacle. To be more specific, the optical receptacle according to the present embodiment is different from optical receptacle 100 according to Embodiment 1 only in shape of wide part 223d of light separation part 223. In view of this, only light separation part 223 is described below. The configurations similar to those of Embodiment 1 are denoted with the same reference numerals, and the description thereof will be omitted.

Figure 7A:
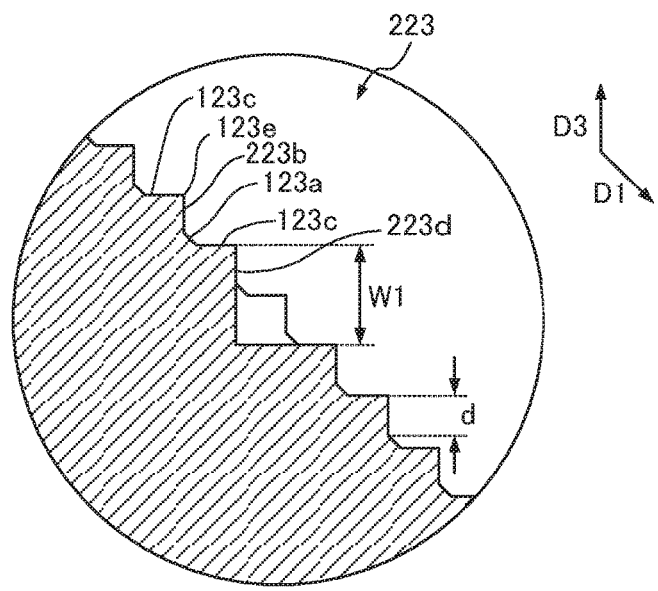
FIGS. 7A and 7B illustrate a configuration of a light separation part of an optical receptacle according to Embodiment 2.
Figure 7B:
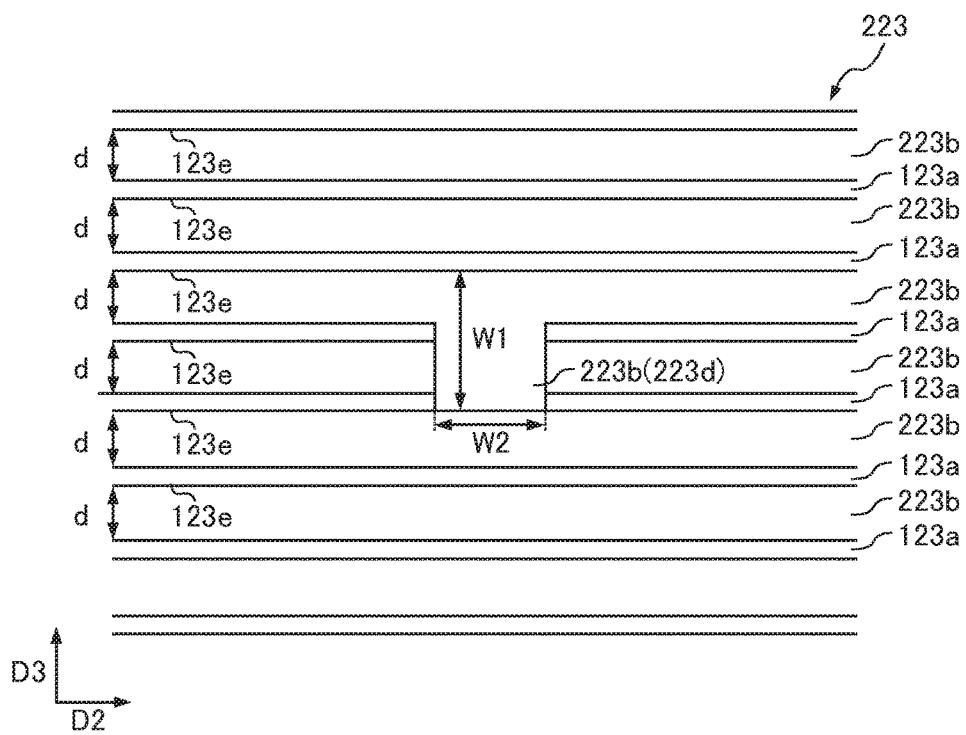

FIGS. 7A and 7B illustrate a configuration of light separation part 223 of the optical receptacle according to Embodiment 2. FIG. 7A is a partially enlarged sectional view (which corresponds to FIG. 4A) of light separation part 223 of the optical receptacle according to Embodiment 2, and FIG. 7B is a partially enlarged front view (which corresponds to FIG. 5) of light separation part 223 of the optical receptacle according to Embodiment 2.

As illustrated in FIGS. 7A and 7B, light separation part 223 of the optical receptacle according to the present embodiment includes a plurality of divided reflection surfaces 123a, a plurality of divided transmission surfaces 223b, a plurality of divided step surfaces 123c and a plurality of ridgelines 123e. Divided step surfaces 123c connect divided reflection surfaces 123a and divided transmission surfaces 223b. Each ridgeline 123e is formed between divided step surface 123c and divided transmission surface 223b.

Widths d of divided transmission surfaces 223b may be equal to each other except in wide part 223d, or may be different from each other. In the present embodiment, widths d of divided transmission surfaces 223b in a direction perpendicular to substrate 111 (third direction D3) are equal to each other except in wide part 223d as illustrated in FIG. 7B. In addition, divided transmission surfaces 223b are disposed in parallel to each other.

Wide part 223d of the optical receptacle according to the present embodiment is formed in a part of divided transmission surface 223b including wide part 223d. In a direction perpendicular to substrate 111 (third direction D3) and in second direction D2, each of length W1 and length W2 of wide part 223d is equal to or greater than image length D of light-emitting surface 113 of light-emitting element 112 in divided transmission surface 223b (W1, W2≥D). With this configuration, also in the optical module according to the present embodiment, by observing an image of light-emitting surface 113 of light-emitting element 112 from second optical surface 125 side, the center position of light-emitting surface 113 can be properly detected. The shape of wide part 223d may be appropriately designed in accordance with the shape of light-emitting surface 113 of light-emitting element 112, and is not limited as long as the above-mentioned function can be obtained.

In addition, wide part 223d formed only in a part of particular divided transmission surface 223b brings about the following effects. As described above, the light quantity ratio between signal light Ls and monitor light Lm depends on the area ratio between divided transmission surface 223b and divided reflection surface 223a in light separation part 223 viewed from reflection surface 122 side. Accordingly, in light separation part 223, the light quantity of signal light Ls is large and the light quantity of monitor light Lm is small in a region where wide part 223d is formed in comparison with a region where wide part 223d is not formed. This state is not desirable from the viewpoint of uniformly separating the incident light into monitor light Lm and signal light Ls regardless of the incident position on light separation part 223. However, with wide part 223d formed only in a part of particular divided transmission surface 223b, the optical receptacle according to the present embodiment can suppress non-uniformity in light quantity ratio between signal light Ls and monitor light Lm that is caused depending on the incident position on light separation part 223 in comparison with optical receptacle 120 of Embodiment 1. Accordingly, the optical module according to the present embodiment can transmit communication information with higher accuracy.

(Effect)

As described above, with wide part 223d formed only in a range required for the positioning of the optical receptacle, the optical receptacle and the optical module according to Embodiment 2 can transmit communication information with higher accuracy while achieving the effect of Embodiment 1.

Embodiment 3

(Configuration of Optical Module)

Optical module 300 according to Embodiment 3 is of a lens array type, and is different from the optical module and the optical receptacle according to Embodiment 2 in that optical module 300 is adapted for multichannel-light transmission along with monitoring, and that optical module 300 is an optical module for transmission and reception. In the following description, the configurations similar to those of Embodiments 1 and 2 are denoted with the same reference numerals, and the description thereof is omitted.

Figure 8:
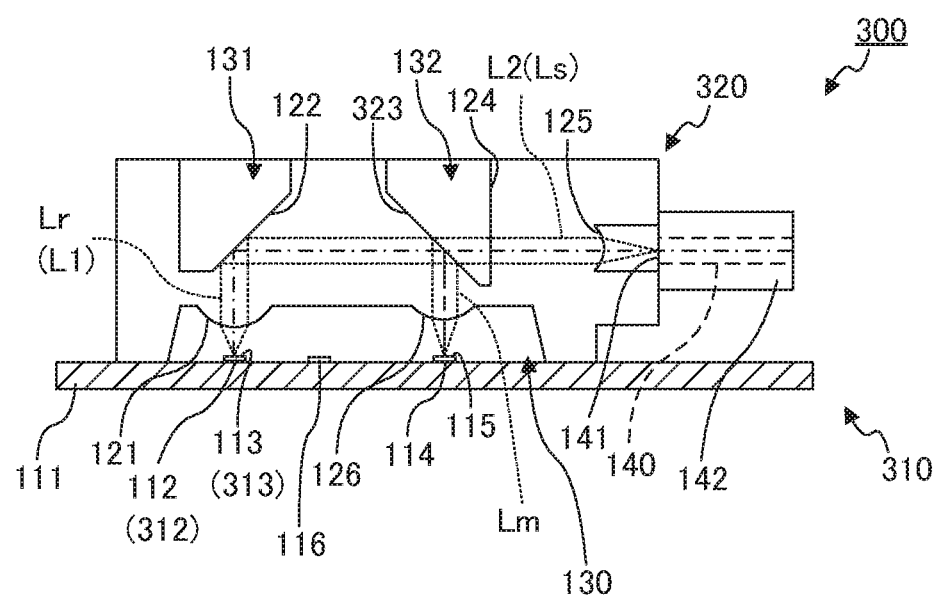
FIG. 8 is a sectional view schematically illustrating a configuration of an optical module according to Embodiment 3.

FIG. 8 is a sectional view schematically illustrating a configuration of optical module 300 according to Embodiment 3. It is to be noted that, in FIG. 8, the hatching on the cross-section of optical receptacle 320 is omitted to illustrate light paths in optical receptacle 320.

As illustrated in FIG. 8, optical module 300 according to Embodiment 3 includes photoelectric conversion device 310, optical receptacle 320 and optical transmission member 140.

In optical module 300 according to the present embodiment, optical transmission member 140 is housed in a multicore collective connector and attached on optical receptacle 320 with a publicly known attaching member. In the present embodiment, twelve optical transmission members 140 are arranged in a line at a constant interval in the depth direction in FIG. 8. It is to be noted that optical transmission members 140 may be arranged in two or more lines.

Photoelectric conversion device 310 includes a plurality of light-emitting elements 112, a plurality of light-receiving elements 312, a plurality of detection elements 114, and control part 116. The numbers of light-emitting elements 112, light-receiving elements 312 and detection elements 114 are not limited as long as a plurality of light-emitting elements 112, a plurality of light-receiving elements 312, and a plurality of detection elements 114 are provided. In the present embodiment, six light-emitting elements 112, six light-receiving elements 312 and six detection elements 114 are provided.

Six light-emitting elements 112 are arranged in a line on substrate 111. In FIG. 8, six light-emitting elements 112 are arranged in a line in the depth direction in the drawing. Six light-emitting elements 112 are arranged at a constant interval along the arrangement direction of optical transmission members 140. It is to be noted that, in the case where optical transmission members 140 are arranged in two or more lines, the number of the lines of light-emitting elements 112 may be identical to that of optical transmission members 140.

Six light-receiving elements 312 receive reception light Lr which has been emitted from optical transmission members 140 and has passed through the inside of optical receptacle 320 (see FIG. 8). Six light-receiving elements 312 are disposed in a line on substrate 111. To be more specific, six light-receiving elements 312 are arranged such that six light-receiving elements 312 and six light-emitting elements 112 are located on the same straight line. Each light-receiving element 312 is a photodiode (PD), for example. It is to be noted that, when optical transmission members 140 are disposed in two or more lines, the number of the lines of reception elements 312 may be identical to that of optical transmission members 140.

Six detection elements 114 are disposed on substrate 111. Six detection elements 114 corresponding to six light-emitting elements 112 are arranged at a constant interval in a line. It is to be noted that, in the case where optical transmission members 140 are arranged in two or more lines, the number of the lines of detection elements 114 may be identical to that of optical transmission members 140.

(Configuration of Optical Receptacle)

FIGS. 9A to 9C illustrate a configuration of optical receptacle 320 according to Embodiment 3. FIG. 9A is a plan view of optical receptacle 320 according to Embodiment 3, FIG. 9B is a bottom view of optical receptacle 320, and FIG. 9C is a front view of optical receptacle 320.

As illustrated in FIGS. 8 to 9C, optical receptacle 320 according to Embodiment 3 includes first optical surface 121, reflection surface 122, light separation part 323, transmission surface 124, second optical surface 125 and third optical surface 126. In the present embodiment, twelve first optical surfaces 121, twelve second optical surfaces 125 and twelve third optical surfaces 126 are provided.

In the present embodiment, upper six first optical surfaces 121 of the twelve first optical surfaces 121 in the drawing are used as transmission-side first optical surfaces 121, and lower six first optical surfaces 121 are used as reception-side first optical surfaces 121. In this manner, in optical receptacle 320 according to the present embodiment, twelve first optical surfaces 121 are divided into equal parts. In addition, with respect to a plane perpendicular to substrate 111, the parts on one side function as transmission-side parts, and the parts on the other side function as reception-side parts.

In optical receptacle 320, the configuration of the parts functioning as the transmission-side parts is identical to that of the optical receptacles according to Embodiments 1 and 2, and therefore the description thereof will be omitted. Only the parts functioning as the reception-side parts are described below.

The parts functioning as the reception-side parts in optical receptacle 320 allow incidence of reception light Lr which is at least a part of emission light L2 emitted from optical transmission members 140, and emit reception light Lr toward light-receiving surfaces 313 (light reception regions) of light-receiving elements 312. In this manner, optical receptacle 320 optically couples end surfaces 141 of optical transmission members 140 and light-receiving surfaces 313 of light-receiving elements 312.

Second optical surfaces 125 serve also as optical surfaces that allow emission light L2 emitted from end surfaces 141 of optical transmission members 140 to enter optical receptacle 120 while refracting emission light L2. Here, second optical surfaces 125 convert light L2 emitted from end surfaces 141 of optical transmission members 140 to collimate light. In addition, preferably, the central axis of each second optical surface 125 coincides with the optical axis of light L2 emitted from each end surface 141 of optical transmission member 140. It is to be noted that, in the case where optical transmission members 140 are arranged in two or more lines, the number of the lines of second optical surfaces 125 may be identical to that of optical transmission members 140.

Transmission surface 124 is an optical surface that once emits, out of optical receptacle 320 toward light separation part 323, light L2 which has entered optical receptacle 320 from second optical surfaces 125 and has passed through the inside of optical receptacle 320. In the present embodiment, transmission surface 124 is a surface perpendicular to light L2 passing through the inside of optical receptacle 320. With this configuration, it is possible to emit, to the outside of optical receptacle 320, light L2 travelling toward light separation part 323 without refracting light L2.

Light separation part 323 controls a part of light L2 emitted out of optical receptacle 320 from transmission surface 124 such that the part of light L2 travels to first optical surface 121 side as reception light Lr.

Figure 10:
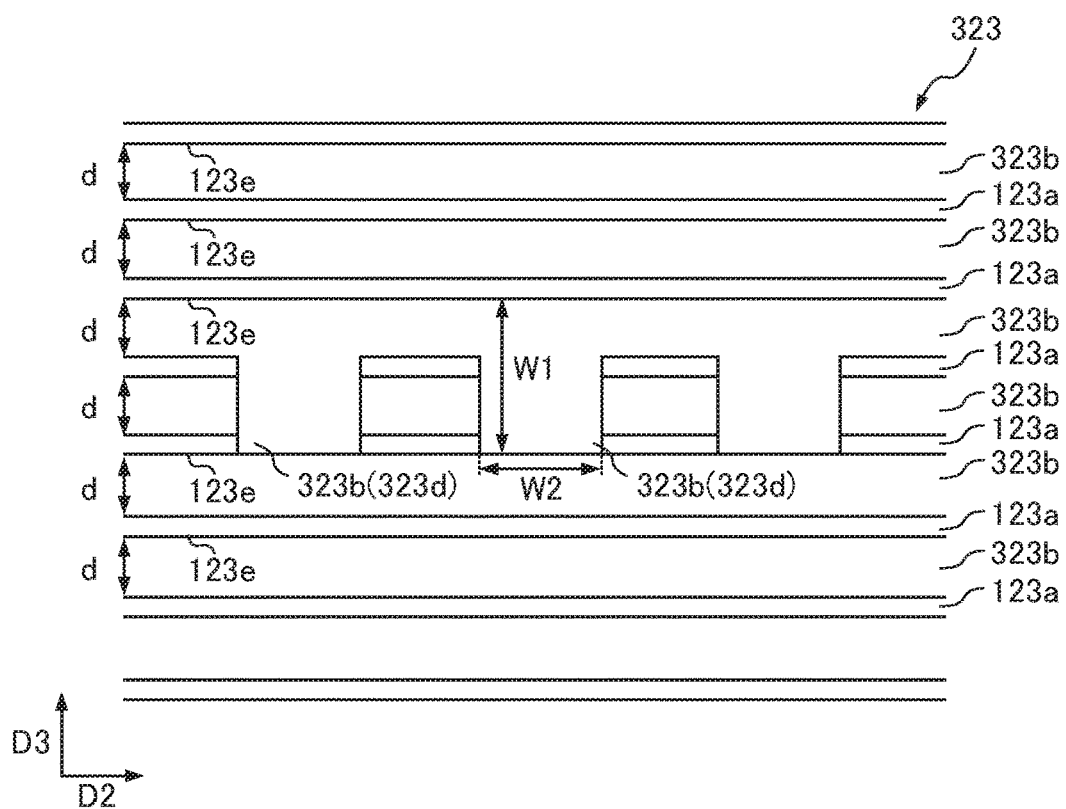
FIG. 10 is a partially enlarged front view of a light separation part of the optical receptacle according to Embodiment 3.

FIG. 10 is a partially enlarged front view of light separation part 323 of optical receptacle 320 according to Embodiment 3. As illustrated in FIG. 10, light separation part 323 includes a plurality of divided reflection surfaces 123a, a plurality of divided transmission surfaces 323b, a plurality of divided step surfaces 123c and a plurality of ridgelines 123e. It is to be noted that, in light separation part 323, the parts functioning as the transmission-side parts and the parts functioning as the reception-side parts have the same configuration.

Divided reflection surfaces 123a are surfaces tilted to the optical axis of light L2 which has entered optical receptacle 320 from second optical surfaces 125 and has been emitted out of optical receptacle 320 from transmission surface 124. Divided reflection surfaces 123a reflect a part of light L2 emitted out of optical receptacle 320 from transmission surface 124.

Divided transmission surfaces 323b are surfaces perpendicular to the optical axis of light L2 which has entered optical receptacle 320 from second optical surfaces 125 and has been emitted out of optical receptacle 320 from transmission surface 124. Divided transmission surfaces 323b allow a part of light L2 reaching divided transmission surfaces 323b to reenter optical receptacle 320, and to pass through divided transmission surfaces 323b toward reflection surface 122. In the present embodiment, divided transmission surfaces 323b of the parts functioning as the reception-side parts include six wide parts 323d (only three wide parts 323d are illustrated in FIG. 10). The six wide parts of the parts functioning as the reception-side parts are arranged in one line at a constant interval along the arrangement direction of optical transmission members 140. It is to be noted that in the case where optical transmission members 140 are arranged in two or more lines, the number of the lines of wide parts 323d may be identical to that of optical transmission members 140.

Reflection surface 122 is an optical surface that reflects, in a direction perpendicular to substrate 111, reception light Lr passing through the inside of optical receptacle 320. The incident angle of reception light Lr on reflection surface 122 is greater than the critical angle.

First optical surfaces 121 are optical surfaces that emit, toward light-receiving elements 312, reception light Lr which has been emitted from end surfaces 141 of optical transmission members 140 and has passed through the inside of optical receptacle 320 while refracting reception light Lr. Here, first optical surfaces 121 emit, toward light-receiving elements 312, the collimate light (reception light Lr) which has traveled inside the optical receptacle 320 while converging the collimate light.

In addition, the light quantity of reception light Lr travelling toward light-receiving surfaces 313 of light-receiving elements 312 is not limited as long as light-receiving elements 312 can appropriately detect reception light Lr. The light quantity of reception light Lr travelling toward light-receiving surfaces 313 of light-receiving elements 312 depends on the area ratio between divided reflection surface 123a and divided transmission surface 323b in light separation part 323 viewed from second optical surface 125 side. In the present embodiment, the light quantity ratio between reception light Lr which passes through divided transmission surface 323b and the light which is reflected by divided reflection surface 123a is 8:2.

Hereinabove, the configurations of optical module 300 and optical receptacle 320 according to the present embodiment are described. Also in optical receptacle 320 according to the present embodiment, wide part 323d is formed in a part of a particular divided transmission surface 323b. In addition, in a direction perpendicular to substrate 111 (third direction D3) and in second direction D2, each of length W1 and length W2 of wide part 323d is equal to or greater than the image length (φD) of light-emitting surface 113 of light-emitting element 112 in divided transmission surface 323b (W1, W2≥D). Further, in third direction D3 and second direction D2, each of length W1 and length W2 of wide part 323d of optical receptacle 320 according to the present embodiment is equal to or greater than the image length (φD) of light-receiving surface 313 of light-receiving element 312 in divided transmission surface 323b (W1, W2≥D). With this configuration, when optical receptacle 320 is positioned with respect to photoelectric conversion device 310, the center position of light-emitting surface 113 (light emission region) of each light-emitting element 112 or light-receiving surface 313 (light reception region) of each light-receiving element 312 can be properly detected from second optical surface 125 side. Finally, light paths in the parts functioning as the reception-side parts in optical module 300 are described.

As illustrated in FIG. 8, light L2 emitted from optical transmission members 140 enters optical receptacle 320 from second optical surfaces 125. At transmission surface 124, light L2 having entered optical receptacle 120 is emitted out of optical receptacle 320 toward light separation part 323. A part of light L2 having reached light separation part 323 reenters optical receptacle 320 from divided transmission surfaces 323b and becomes reception light Lr. Reception light Lr is reflected by reflection surface 122 toward first optical surfaces 121. Reception light Lr having reached first optical surfaces 121 is emitted by first optical surfaces 121 out of optical receptacle 320, and reaches light-receiving surfaces 313 of light-receiving elements 312. In this manner, a part of light L2 emitted from optical transmission members 140 reaches reception surfaces 313 of light-receiving elements 312 as reception light Lr.

(Effect)

In the above-mentioned manner, optical module 300 and optical receptacle 320 according to Embodiment 3 can handle multichannel-light transmission along with monitoring while achieving the effect of Embodiment 2. In addition, optical module 300 according to Embodiment 3 can function as an optical module for transmission and reception.

It is to be noted that the present invention is not limited to Embodiments 1 to 3. The wide part of the optical receptacle according to the embodiments of the present invention can be employed in an optical receptacle and an optical module including a light separation part provided with a divided reflection surface and a divided transmission surface. For example, the configuration of the light separation part of the optical receptacle according to the embodiments of present invention is also applicable to a light separation part in which a plurality of divided reflection surfaces and a plurality of divided transmission surfaces are alternately disposed in a first direction and a second direction as in the optical receptacle disclosed in Japanese Patent Application Laid-Open No. 2015-014748.

Figure 11:
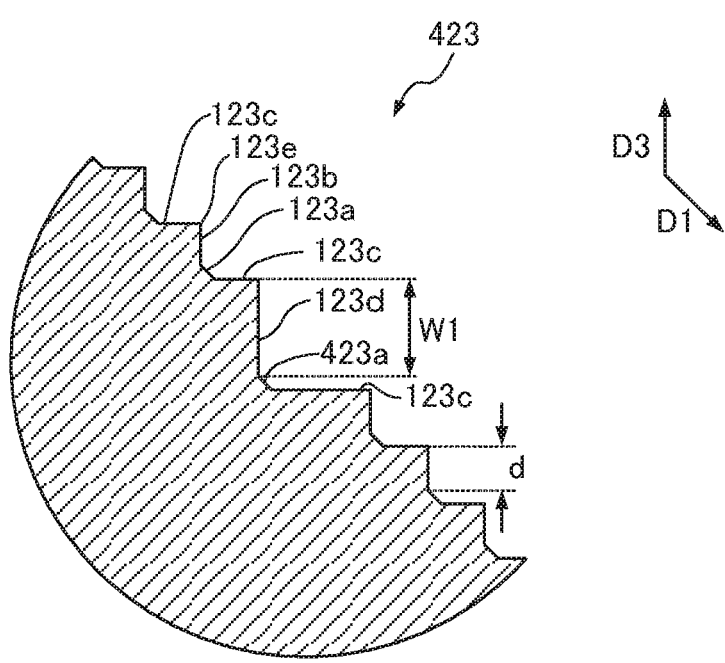
FIG. 11 illustrates a configuration of a light separation part of an optical receptacle according to a modification.

While no divided reflection surface 123a is formed between divided step surface 123c and wide part 123d, 223d or 323d in Embodiments 1 to 3, the configuration of the light separation part of the optical receptacle according to the embodiments of the present invention is not limited to this. FIG. 11 illustrates a configuration of light separation part 423 of an optical receptacle according to a modification. As illustrated in FIG. 11, in light separation part 423 of the optical receptacle, divided reflection surface 423a is included between wide part 123d and divided step surface 123c.

In addition, while wide part 323d is formed only in a part of a particular divided transmission surface 323b in Embodiment 3, wide part 323d may be formed in the entirety of a particular divided transmission surface 323b (see Embodiment 1).

In addition, a reflection film composed of a thin film of a metal having a high light reflectance (such as Al, Ag and Au) may be formed on reflection surface 122 and divided reflection surface 123a. In the case where reduction of the number of components is desired to be prioritized, it is preferable to employ a configuration in which only a total reflection surface is utilized.

This application is entitled to and claims the benefit of Japanese Patent Application No. 2015-197027 filed on Oct. 2, 2015, the disclosure each of which including the specification, drawings and abstract is incorporated herein by reference in its entirety.

INDUSTRIAL APPLICABILITY

The optical receptacle and the optical module according to the embodiments of the present invention are suitable for optical communications using an optical transmission member, for example.

REFERENCE SIGNS LIST

10 Optical module
20 Photoelectric conversion device
21 Light-emitting element
22 Optical transmission member
23 End surface
24 Detection element
30 Optical receptacle
31 First optical surface
32 Reflection surface
33 Light separation part
33a Divided reflection surface
33b Divided transmission surface
34 Transmission surface
35 Second optical surface
36 Third optical surface
37 Recess
100, 300 Optical module
110, 310 Photoelectric conversion device
111 Substrate
112 Light-emitting element
113 Light-emitting surface
114 Detection element
115 Detection surface
116 Control part
120, 320 Optical receptacle
121 First optical surface
122 Reflection surface
123, 123', 223, 323, 423 Light separation part
123a, 423a Divided reflection surface
123b, 123b', 223b, 323b Divided transmission surface
123c Divided step surface
123d, 223d, 323d Wide part
123e Ridgeline
124 Transmission surface
125 Second optical surface
126 Third optical surface
130 First recess
131 Second recess
132 Third recess
140 Optical transmission member
141 End surface
142 Ferrule
312 Light-receiving element
313 Light-receiving surface
L1 Light emitted from light-emitting element
L2 Light emitted from optical transmission member
Ls Signal light
Lm Monitor light
Lr Reception light

The invention claimed is:

1. An optical receptacle configured to be disposed between an optical transmission member and a photoelectric conversion device, the photoelectric conversion device including a substrate, and a photoelectric conversion element and a detection element for monitoring emission light which has been emitted from the photoelectric conversion element that are disposed on the substrate, the optical receptacle being configured for optically coupling the photoelectric conversion element and an end surface of the optical transmission member, the optical receptacle comprising:

a first optical surface that allows incidence of the emission light which has been emitted from the photoelectric conversion element, or that emits, toward the photoelectric conversion element, reception light which has been emitted from the end surface of the optical transmission member and has passed through inside of the optical receptacle;

a reflection surface that reflects, in a direction along the substrate, the emission light which has entered the optical receptacle from the first optical surface, or that reflects, in a direction perpendicular to the substrate, the reception light which has passed through the inside of the optical receptacle;

a second optical surface that emits, toward the end surface of the optical transmission member, the emission light which has been reflected by the reflection surface, or that allows incidence of the reception light which has been emitted from the end surface of the optical transmission member;

a light separation part that separates the emission light which has been reflected by the reflection surface into monitor light travelling toward the detection element and signal light travelling toward the end surface of the optical transmission member, or that allows, to travel toward the first optical surface side, at least a part of the reception light which has entered the optical receptacle from the second optical surface, the light separation part being disposed on a light path between the first optical surface and the second optical surface; and a third optical surface that emits, toward the detection element, the monitor light which has been separated by the light separation part, wherein the light separation part includes:

a plurality of divided reflection surfaces that are tilted to an optical axis of the emission light which has been reflected by the reflection surface, and a plurality of divided transmission surfaces that are perpendicular to the optical axis of the emission light which has been reflected by the reflection surface and an optical axis of the reception light which has entered the optical receptacle from the second optical surface, wherein the plurality of divided reflection surfaces and the plurality of divided transmission surfaces are alternately disposed along a first direction, the first direction being an inclination direction of the divided reflection surface, wherein the plurality of divided reflection surfaces internally reflect, toward the third optical surface side, a part of the emission light which has been reflected by the reflection surface as the monitor light, wherein the plurality of divided transmission surfaces allow, to pass through the plurality of divided transmission surfaces toward the second optical surface side, a part of the emission light which has been reflected by the reflection surface as the signal light, or allow, to pass through the plurality of divided transmission surfaces toward the reflection surface side, a part of the reception light which has entered the optical receptacle from the second optical surface, and wherein at least one of the plurality of divided transmission surfaces includes a wide part whose width is greater than a width of another of the plurality of divided transmission surfaces in the direction perpendicular to the substrate.

2. The optical receptacle according to claim 1, wherein, in a second direction that is orthogonal to both the direction perpendicular to the substrate and the first direction, the wide part extends over an entirety of the at least one of the plurality of divided transmission surfaces including the wide part.

3. The optical receptacle according to claim 1, wherein the wide part is formed in a part of the at least one of the plurality of divided transmission surfaces including the wide part.

4. An optical module comprising:

a photoelectric conversion device including a substrate, a photoelectric conversion element disposed on the substrate and having a light emission region or a light reception region, and a detection element disposed on the substrate and configured for monitoring emission light which has been emitted from the light emission region of the photoelectric conversion element; and the optical receptacle according to claim 1, wherein, in the direction perpendicular to the substrate and in the second direction orthogonal to both the direction perpendicular to the substrate and the first direction, a length of the wide part is equal to or greater than a length of an image of the light emission region or the light reception region of the photoelectric conversion element in the plurality of divided transmission surfaces.

* * * * *